(12) United States Patent
Fan (10) Patent No.: US 6,260,870 B1
(45) Date of Patent: Jul. 17, 2001

(54) STRUCTURE TELESCOPIC-TYPE FRONT FORK CUSHION FOR BICYCLES

(76) Inventor: Jeeng-Neng Fan, No. 34, Alley 10, Lane 54, Sec. 2, Yangsin Rd., Yang mei, Taoyuan (TW)

( * ) Notice: Subject to any disclaimer, the term of this patent is extended or adjusted under 35 U.S.C. 154(b) by 0 days.

(21) Appl. No.: 09/500,035

(22) Filed: Feb. 8, 2000

(51) Int. Cl.$^7$ .................................................. B62K 25/08
(52) U.S. Cl. ............................................................. 280/276
(58) Field of Search ................................. 280/275, 276, 280/277, 279, 280

(56) References Cited

U.S. PATENT DOCUMENTS

| | | | |
|---|---|---|---|
| 1,052,808 | * | 2/1913 | Feilbach . |
| 1,780,034 | * | 10/1930 | Osborn et al. . |
| 3,208,767 | * | 9/1965 | Moulton . |
| 5,308,099 | * | 5/1994 | Browning .............................. 280/276 |

* cited by examiner

Primary Examiner—Kevin Hurley
(74) Attorney, Agent, or Firm—Rosenberg, Klein & Lee (57) ABSTRACT

An improved structure telescopic-type front fork cushion for bicycles comprised of lower bushings providing for coordinated excursive contact with the stanchion tubes and sliders that are installed at the lower ends of the sliders at the same position as the dropouts and in which a cushioning elastic body is installed inside a cross member-mounted steerer tube at the upper ends of the two stanchion tubes and that is situated between the center section of a connective block at the upper ends of the two sliders. As such, when the front wheel axle of a bicycle is installed into the dropouts, the lower bushings by means of the dropouts function as the direct fulcrum points of the raked arrangement of the stanchion tubes and the sliders such that the absence of stiction angles during their kinetic ascending and descending operation thereby providing the smoothness and responsiveness objectives claimed. Furthermore, only one single cushioning elastic body is installed between the two stanchion tubes and slides which in addition to effectively providing for simpler and more convenient assembly also offers much greater cushioning travel through stanchion tubes and sliders in which the cushioning force is always balanced.

5 Claims, 8 Drawing Sheets

STRUCTURE TELESCOPIC-TYPE FRONT FORK CUSHION FOR BICYCLES

BACKGROUND OF THE INVENTION

1) Field of the Invention

The invention herein relates to an improved structure telescopic-type front fork cushion for bicycles.

2) Background of the Prior Art

Figure 1:
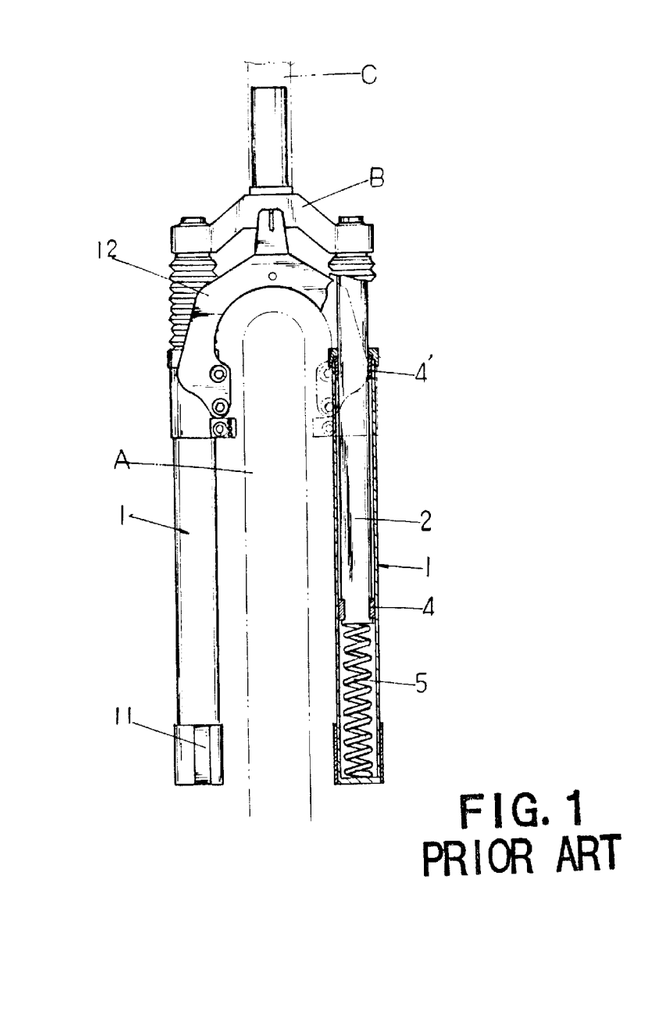
FIG. 1 is a composite orthographic and cross-sectional drawing of a conventional telescopic-type front fork, as viewed from a frontal perspective.
Figure 2:
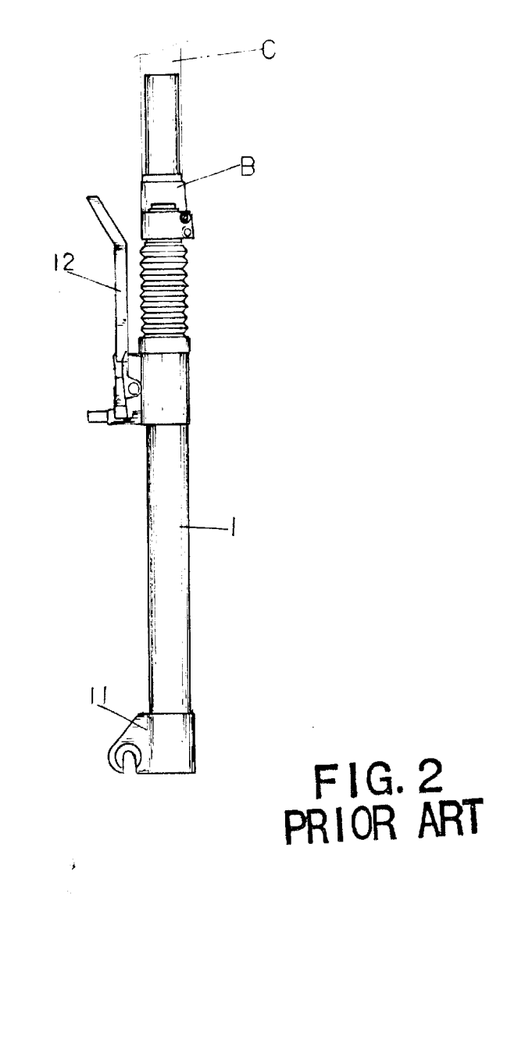
FIG. 2 is an orthographic drawing of a conventional telescopic-type front fork, as viewed from a lateral perspective.

To enable additional physical comfort while bicycle riding, shock absorbers are installed on bicycles and today such components are indispensable and, furthermore, crucial to bicycling. The majority of the bicycle shock absorber equipment in use at present are systems installed to curtail shock at the front fork, chainstays, handlebar stem, and seat post. Of these, the said front fork shock absorber systems include linkage and telescopic types, with the telescopic-type accounting for the majority of front fork shock absorbers available on the market and, furthermore, is the type in most widespread usage. The said telescopic-type front fork shock absorber system, as indicated in FIG. 1 and FIG. 2, is comprised of left and right sliders 1, each having a dropout 11 at the outer aspect of the bottom ends into which is installed the center axle of the front wheel A as well as an arch-shaped connective block 12 conjoining the top ends for bracing purposes; installed on the upper ends of the left and right stanchion tubes 2 are the left and right sides of a front fork crown B which enables the structural integrated to the bicycle frame by installing the front fork crown B to the head tube C, with the lower ends of the stanchion tubes 2 then respectively inserted into the left and right sliders 1; upper and lower bushings 4' and 4 are installed on the stanchion tubes 2 and in the sliders 1, respectively, with the said bushings capable of supporting excursive movement, wherein the upper bushings 4' are mounted at the upper ends of the sliders 1 and the lower bushings 4 are mounted in the lower ends of the stanchion tubes 2; left and right cushioning elastic bodies 5 are respectively installed at the bottom section inside the left and right sliders 1, with their upper ends situated against the left and right stanchion tubes 2, thereby enabling the stanchion tubes 2 and sliders 1 to provide a cushioning elastic force to the bicycle frame.

When riding over an irregular road surface, elastic force is transferred to the stanchion tubes 2 and the sliders 1 by the cushioning elastic bodies 5 and then the shock generated by the front wheel A due to the irregular road surface is thereby cushioned and not directly transmitted to bicycle frame C so that the rider experiences more comfortable riding performance. The arrangement of the said telescopic-type front fork shock absorber structure is undeniably capable of bicycle front fork shock absorption and cushioning operation and provides practical value as well as effectiveness and, furthermore, is currently the most wide utilized type. However, following long-term usage, manufacturers have evidently discovered that such simple and economical structures have in actual utilization a few shortcomings that await and, furthermore, require improvement. Since the bicycle front fork is installed in a raked configuration (lower end facing forward and upper end facing rearward), after the front wheel A, bicycle frame C, handlebar, and other components are assembled, this facilitates control by the rider. However, since the upper and lower bushings 4' and 4 that provide for the excursive movement of the stanchion tubes 2 and the sliders 1 are all positioned at the upper extent of the dropouts 11 (specifically referring to the lower bushings 4 installed at the bottom ends of the stanchion tubes 1 that are subject to the travel limits of the cushioning elastic bodies 5 and which are situated at a permanent position at the upper extent of the dropouts 11), therefore, after the center axle of the front wheel A is installed in the said dropouts 11, the said front wheel A on the ground exerts an upward vertical force to the dropouts 11 such that the dropouts 11 become the points of applied force and the upper and lower bushings 4' and 4 become the fulcrum points; thus, when in the course of riding on an irregular road surface an upward force is conveyed from the front wheel A to the dropouts 11 (the points of applied force), the upper and lower bushings 4' and 4 (the two fulcrum points) at their upper extents cause stiction angles to be automatically produced in the stanchion tubes 1 and the sliders 2 due to their raked arrangement; as a result, a greater magnitude of frictional force is generated by the elastic ascending and descending action of the said stanchion tubes 1 and sliders 2, with a corresponding decrease in the smoothness and responsiveness of their kinetic and excursive movement and, at the same time, the cushioning and shock absorption characteristics of the cushioning elastic bodies 5 exhibit the drawbacks of lower sensitivity and positiveness. Specifically, if smoother and more responsive action is to be achieved by the said raked stanchion tubes 2 and sliders 1, the lower bushings 4 (the lower fulcrum points) installed at the bottom ends of the stanchion tubes 2 must be positioned in closer proximity to the dropouts 11 (the points of applied force) and as close as possible for the most optimal results (stiction angles are less likely to be produced the closer the lower bushings 4 are positioned to the points of force); however, this approach significantly affects the travel of the cushioning elastic bodies 5 and greatly detracts the cushioning and shock absorbing performance. Conversely, the farther the position of the lower bushings 4 (the lower fulcrum points) from the dropouts 11 (the points of applied force)—although this advantageously lengthens the travel of the cushioning elastic bodies 5, the greater the degree of the produced friction angles, which precludes the achievement of the claimed objectives of cushioning, shock absorption, and comfortable riding due to the substantial abating of performance by the said shortcomings.

Based on the foregoing section, in the structural arrangement of conventional telescopic-type bicycle front fork shock absorber systems, the upper and lower bushings 4' and 4 that provide for the excursive contact of the stanchion tubes 2 and sliders 1 are situated at the upper extent of the dropouts 11, which in actual application still exhibits utilization shortcomings that await and, furthermore, require improvement.

SUMMARY OF THE INVENTION

The primary objective of the invention herein is to provide an improved structure telescopic-type front fork cushion for bicycles in which after the two lower bushings providing for the excursive contact of the stanchion tubes and sliders are installed in the sliders and at the same position as the dropouts at the lower ends of the sliders, then following the installation of the bicycle front wheel axle into the slider dropouts, the lower bushings by means of the dropouts function as the direct fulcrum points of the raked configuration of the stanchion tubes and the sliders such that stiction angles are not produced during their ascending and descending operation, unlike the conventional counterpart wherein the upper and lower bushings are situated at the upper extent of the dropouts and hence are productive of stiction angles, resulting in an ascending and descending operation that is not smooth or responsive as well as cushioning performance that is not positive, all of which are shortcomings awaiting and, furthermore, requiring improvement.

Another objective of the invention herein is to provide an improved structure telescopic-type front fork cushion for bicycles in which a single cushioning elastic body is installed in a cross member-mounted steerer tube conjoining two stanchion tubes and that is situated between the center section of a connective block conjoining two sliders and, furthermore, the elastic force is variable by an adjustment screw and nut such that the elastic force provided to the said two stanchion tubes and sliders is constantly maintained in a balanced state, while the cushioning elastic force always remains adjustable to meet operational requirements.

Yet another objective of the invention herein is to provide an improved structure telescopic-type front fork cushion for bicycles in which a single cushioning elastic body is installed in a cross member-mounted steerer tube conjoining two stanchion tubes and that is situated between the center section of a connective block conjoining two sliders such that the cushioning travel of the said stanchion tubes and sliders is effectively increased and thereby enables more positive cushioning and shock absorption performance.

Still another objective of the invention herein is to provide an improved structure telescopic-type front fork cushion for bicycles in which utilization is simple and convenient and that enables the elastic ascending and descending operation of the telescopic-type front fork stanchion tubes and sliders to be smoother and more responsive by effectively improving upon the static friction between the stanchion tubes and the sliders and thereby achieving cushioning and shock absorption characteristics that are more sensitive as well as more positive to increase shock diminishing performance, thus providing even greater bicycle riding comfort, while meeting the criteria of practicality, ideals of perfection, and progressiveness and, furthermore, in an improved structure telescopic-type front fork shock cushion for bicycles that has never been available prior to the introduction of the present invention.

DETAILED DESCRIPTION OF THE INVENTION

Figure 3:
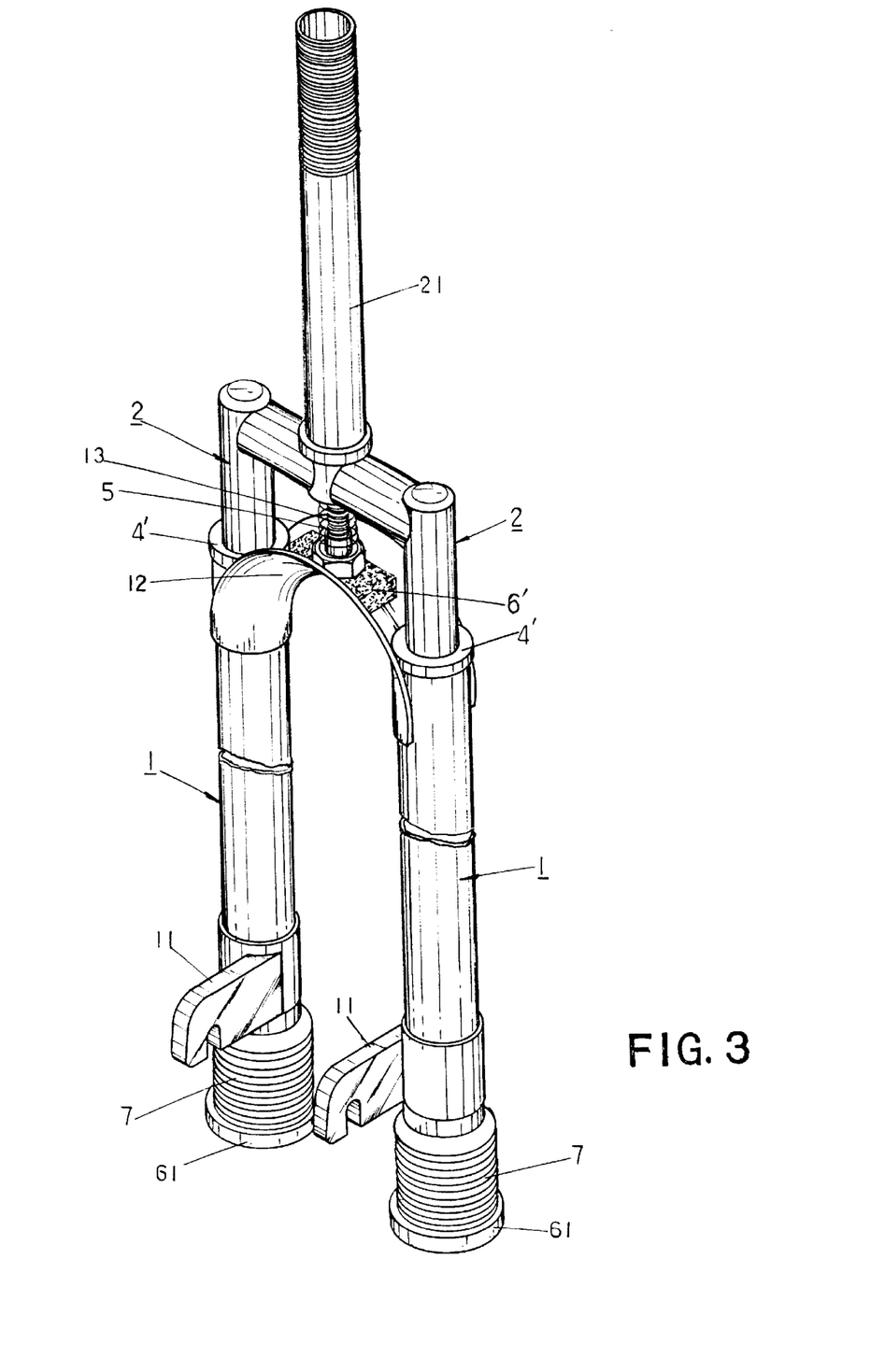
FIG. 3 is an isometric drawing of the invention herein that shows the contact points of the four bushings.
Figure 4:
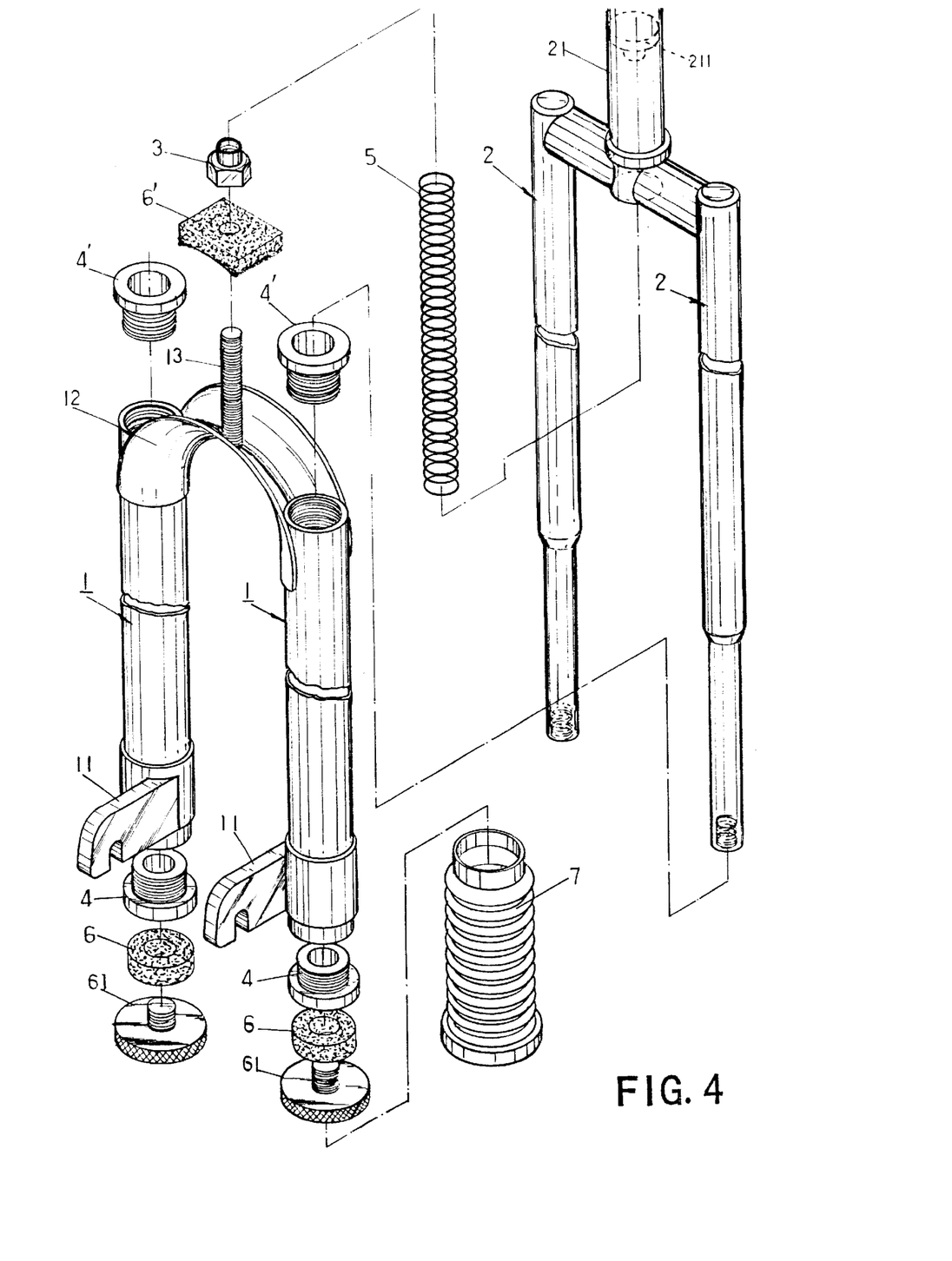
FIG. 4 is an exploded drawing of FIG. 3.

Referring to FIG. 3 and FIG. 4, the improved structure telescopic-type front fork cushion for bicycles of the invention herein is comprised of two sliders 1 each having a forward facing dropout 11 disposed at the bottom end that provides for the installation and mounting of a front wheel axle as well as a connective block 12 positioned between and conjoining the inner sides of the top ends, with an adjustment screw 13 projecting upward from the center section of the connective block 12; two stanchion tubes 2 that are each inserted from top to bottom into one of the sliders 2 and conjoined at their top ends by a cross member-mounted steerer pipe 21 that is assembled to the bicycle frame by installation to the head tube and, furthermore, is aligned with the adjustment screw 13 between the two sliders 1; an adjustment nut 3 that is fastened onto the adjustment screw 13 of the two sliders 1; four bushings 4 and 4' constructible of Teflon that are respectively positioned at the top and bottom ends of the two sliders 1 and, furthermore, which are configured to permit the excursive movement of the two stanchion tubes 2, wherein the said bushings 4 positioned at the bottom ends of the sliders 1 are situated at the same height as the dropouts 11; a cushioning elastic body 5 that is contained in the cross member-mounted steerer tube 21 conjoining the two stanchion tubes 2 and, furthermore, the upper end is checked by a stop block 211 and the bottom end is situated against the adjustment nut 3, thereby providing for a constant elastic force between the stanchion tubes 2 and the sliders 1; three elastic pads 6 and 6', of which the two elastic pads 6 are each mounted to a bottom end of the stanchion tubes 2 by a packing block 61 and, furthermore, are each aligned with the two lower bushings 4 at the bottom sections of the sliders 1, thereby providing the maximum ascent limit point of the cushioning body, and the other elastic pad 6' is installed at the bottom section of the adjustment screw 13 between the two sliders 1 and, furthermore, is aligned with the horizontal section of the cross member-mounted steerer tube 21, thereby providing the maximum descent limit point of the cushioning body; and two dust covers 7 that are respectively installed over the bottom ends of the two stanchion tubes 2 and sliders 1.

Figure 5:
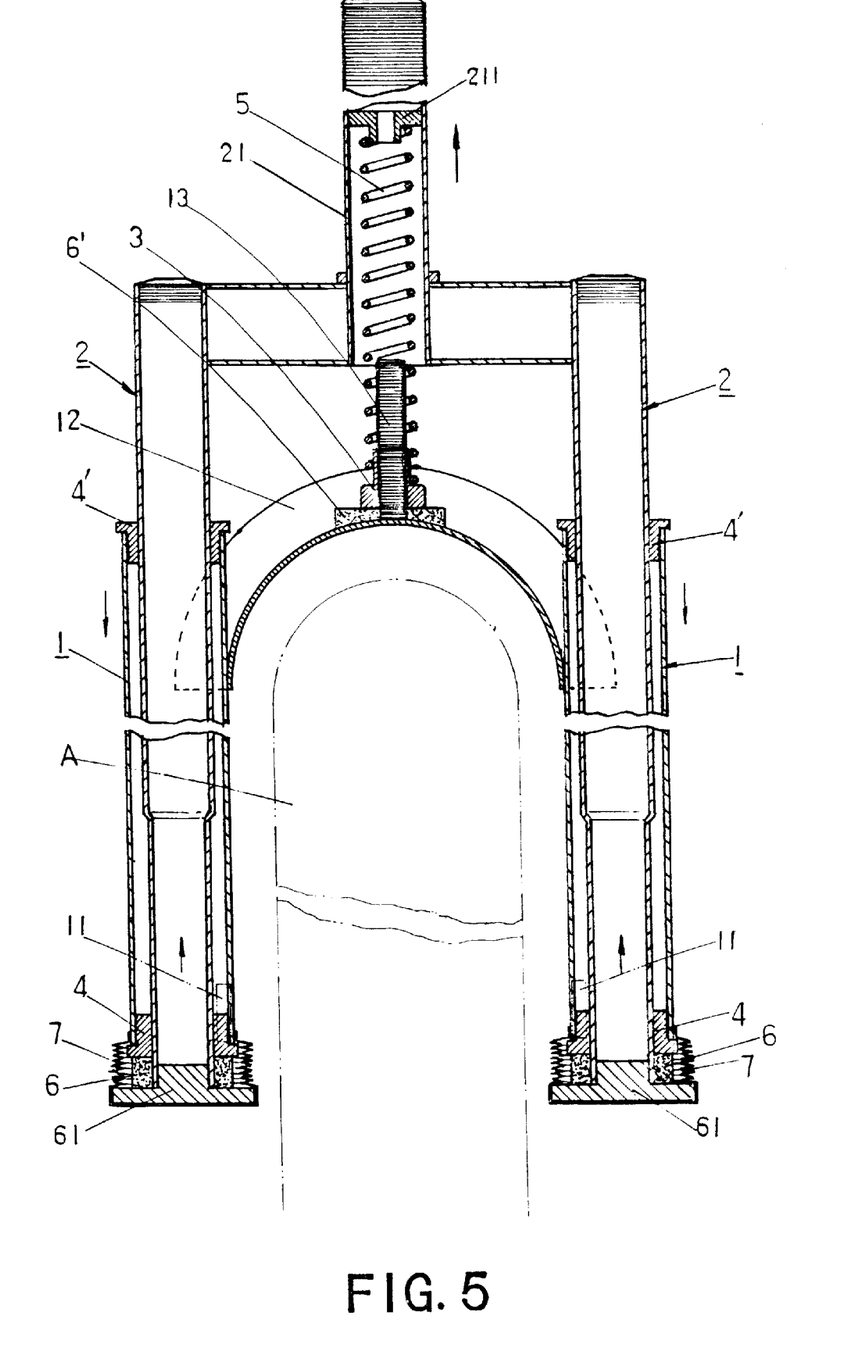
FIG. 5 is a cross-sectional drawing of FIG. 3 that illustrates the elastic extension operation of the stanchion tubes and sliders.
Figure 6:
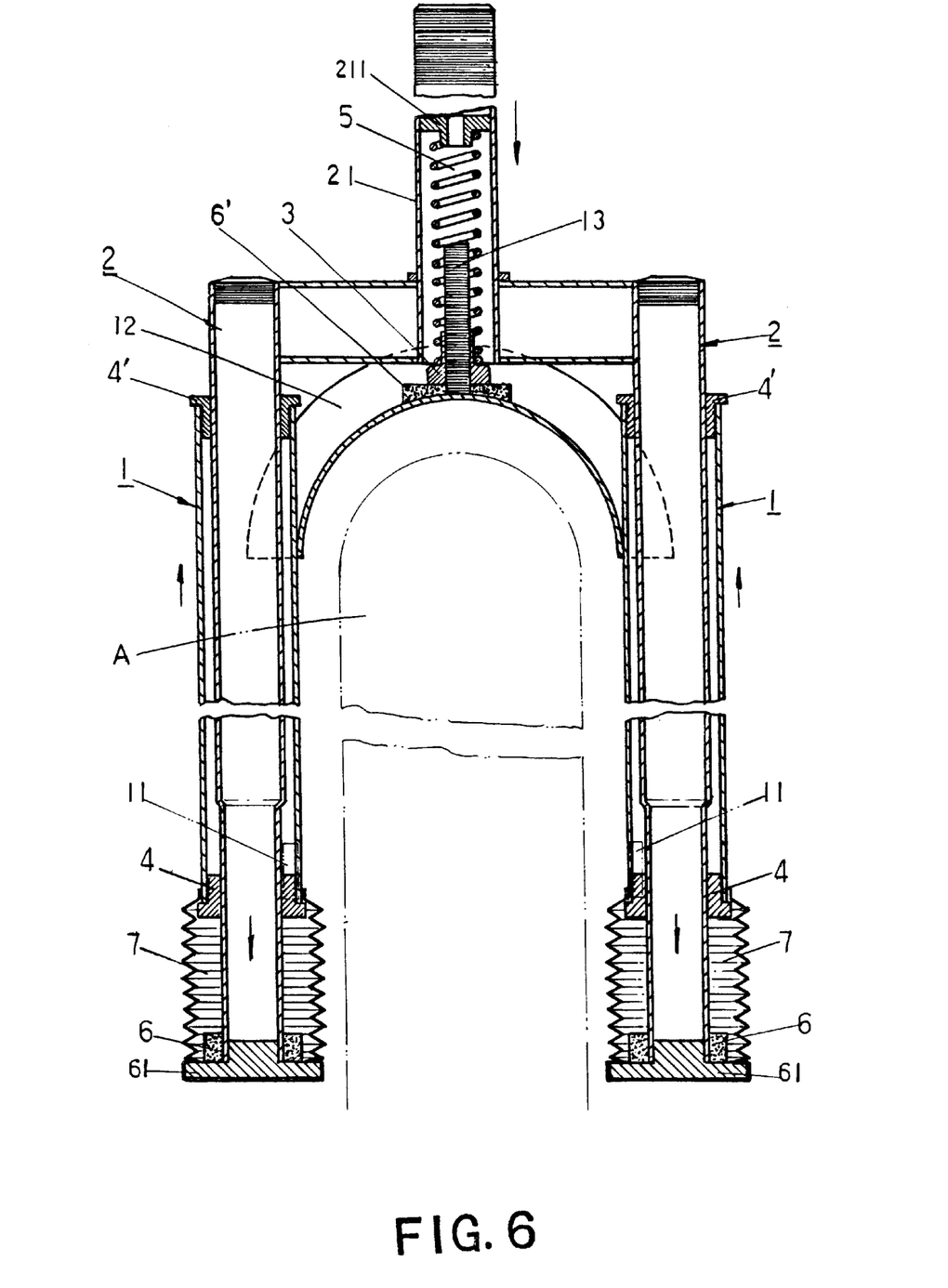
FIG. 6 is a cross-sectional drawing of FIG. 3 that illustrates the elastic compression operation of the stanchion tubes and sliders.

Referring to FIG. 5 and FIG. 6, since the said cushioning elastic body 5 is positioned between the connective block 12 of the two sliders 1 and the cross member-mounted steerer tube 21 of the stanchion tubes 2, which unlike the conventional counterpart is not placed in each of the stanchion tubes and sliders, when the two stanchion tubes 2 are each inserted from top to bottom into the sliders 1, in addition to the presence of elastic force between the said two stanchion tubes 2 and sliders 2, when the lower ends of the said two stanchion tubes 2 elastically ascend and descend, they are each exposed at the bottom ends of the sliders 1.

To further elaborate, when the bicycle front wheel A is installed on the center axle mounted in the dropouts 11 at the lower ends of the two sliders 2 and, furthermore, after the front wheel A is on the ground, since the lower ends of the said two stanchion tubes 2 are exposed at the lower ends of the two sliders 1 and the said lower bushings 4 providing for coordinated excursive contact with the two stanchion tubes 2 and sliders 1 and installed at the slider 1 bottom sections are at the same position (i.e., height position) as the dropouts 11, therefore, although the said front wheel A on the ground forces the dropouts 11 upward along the rake of the said stanchion tubes 2 and sliders 1, as the position of the said two lower bushings 4 are identical to that of the two dropouts 11 and similarly function as points of applied force (i.e., the fulcrum points), consequently, stiction angles are not generated by the upward force as would be produced in the stanchion tubes 2 and sliders 1 of the conventional raked arrangement, enabling the elastic ascending and descending operation of the stanchion tubes 2 and the sliders 1 to be smoother and more responsive in performance. Of course, with no stiction angles produced by the stanchion tubes 2 and sliders 1 at the fulcrum points of the telescopic-type front fork at the said two bushings 4 situated at the lower ends of the sliders 1 and the dropouts 11, the other upper bushings 4' respectively installed at the top ends of the sliders 1 that permit the excursive movement of the two stanchion tubes 2 only have to provide stability and balance and, without increasing friction, positively assists the stanchion tubes 2 and the sliders 1 to elastically ascend and descend in an operation that is smoother and more responsive.

In other words, when riding on a irregular road surface and the vibrational forces of the front wheel A are transferred to the dropouts 11 at the bottom ends of the sliders 1, due to the lower bushings 4 providing for coordinated excursive contact with the two stanchion tubes 2 and sliders as well as their arrangement at the same position as the dropouts 11, after the coordinated excursion of the lower ends of the said stanchion tubes 2 in the lower bushings 4 and their exposure at the bottom ends of the sliders 1, which unlike the conventional counterparts are not permanently positioned at the upper extent of the lower bushings 4, therefore, in operative coordination with the cushioning elastic body 5, the lower bushings 4 by means of the dropouts 11 function as the direct fulcrum points of the raked arrangement of the stanchion tubes 2 and the sliders 1 such that the absence of stiction angles during their elastic ascending and descending operation thereby enables the cushioning elastic body 5 to achieve positive and sensitive shock diminishing performance during the smooth and responsive ascending and descending operation. Of course, with the said other two upper bushings 4' only having to provide stability and balance, even smoother excursion occurs during the ascending and descending operation of the said stanchion tubes 2 and sliders 1.

Furthermore, since the cushioning elastic body 5 that actually provides telescopic-type front fork cushioning and shock absorption consists of a single component that is inserted into the interior section of the cross member-mounted steerer tube 21 conjoining the two stanchion tubes 2, with the bottom end situated against the adjustment nut 3 in the center section of the connective block 12 conjoining the two sliders 1, unlike the conventional counterpart which requires the placement of a cushioning elastic body in each of its two stanchion tubes and sliders, therefore, in addition to effectively providing for simpler and more convenient assembly, the arrangement of the present invention offers substantially enhanced cushioning travel without influencing to any degree cushioning and shock absorption smoothness and responsiveness, thereby providing the two left and right stanchion tubes 2 and sliders 1 with a balanced elastic force and thus precluding the necessity, as in the conventional counterpart, of installing one cushioning elastic body into each of the left and right stanchion tubes and sliders—which involves more troublesome assembly—and, furthermore, effectively improves upon the ready onset of elastic force imbalances in the said left and right cushioning elastic bodies following long-term usage that results in shortening the actual length of cushioning travel and other shortcomings.

Additionally, since the said cushioning elastic body 5 is situated against the adjustment nut 3 and the said adjustment nut 3 is fastened onto the adjustment screw 13 in the connective block 12 conjoining the two sliders 1, then, as per utilization requirements, the bicycle rider can easily turn the adjustment nut 2 upward and downward to vary the elastic force exerted by the cushioning elastic body 5, enabling the two stanchion tubes 2 and sliders 1 to provide a cushioning elastic force to the bicycle frame capable of being positively and effectively adjusted at any time.

Furthermore, since an elastic pad 6 is installed at both bottom ends of the two stanchion tubes 2 and the elastic pad 6' is installed at the bottom section of the adjustment screw 13 in the connective block 12 conjoining the two sliders 1, when the bicycle wheel A is imprudently directed into a depression or is negotiated over a road surface of highly irregular terrain such that the resultant magnitude of ascent and decent by the two stanchion tubes 2 and sliders 1 is considerably intensified, the initial contact is handled by said elastic pads 6 and 6' at the lower bushings 4 on the bottom ends of the sliders 2 and at the horizontal section of the cross member-mounted steerer tube 21, respectively, and thereby serve as cushioning bodies at the maximum ascent limit and the maximum descent limit and consequently, the said cushioning elastic body 5, the stanchion tubes 2, the sliders 1, the lower bushings 4, and other structural components are afforded immediate protection and are not susceptible to becoming damaged, while the bicycle rider enjoys more comfortable bicycling performance.

Figure 7:
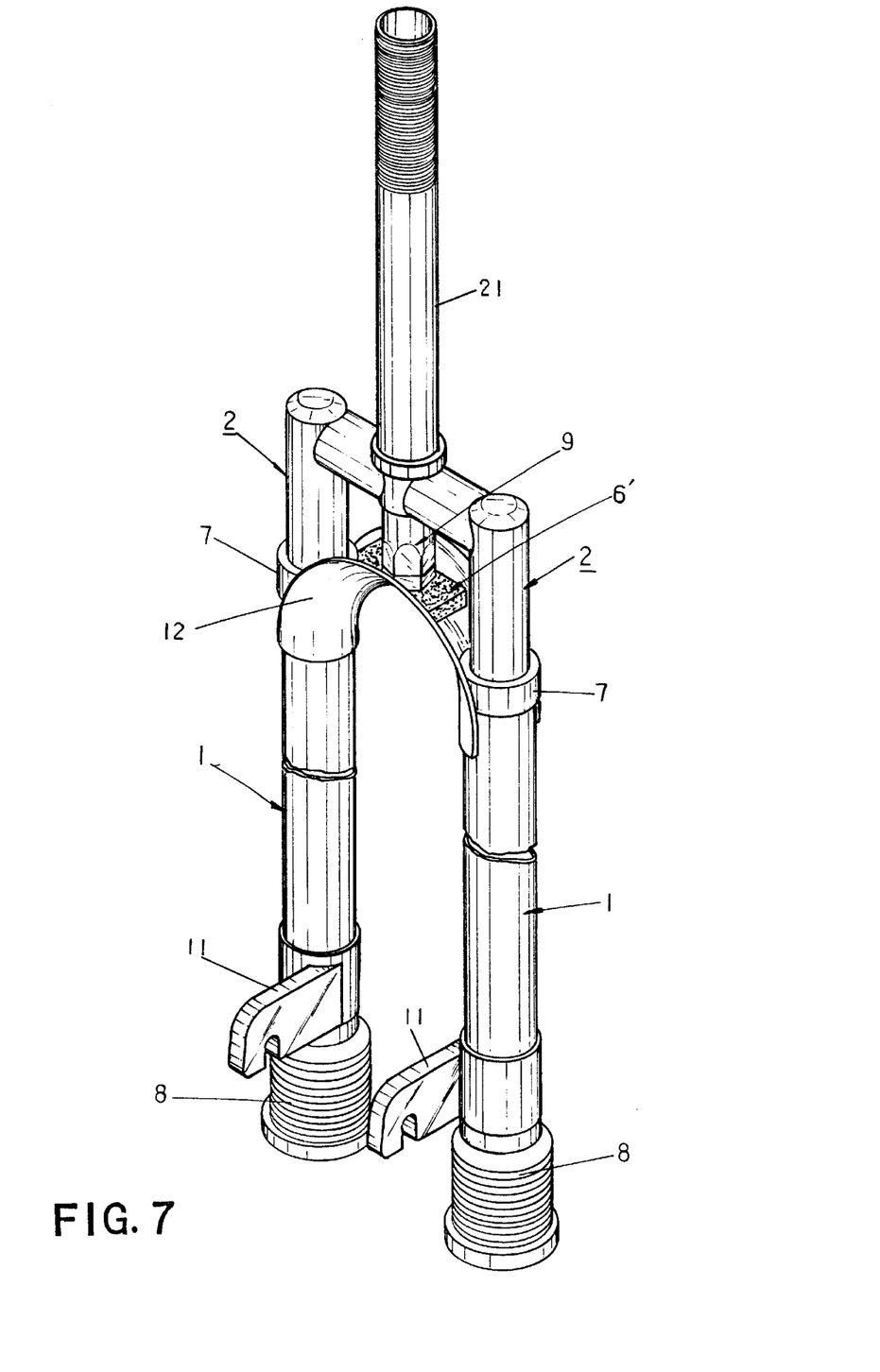
FIG. 7 is an isometric drawing of another embodiment of the invention herein that shows the contact points of the three bushings.
Figure 8:
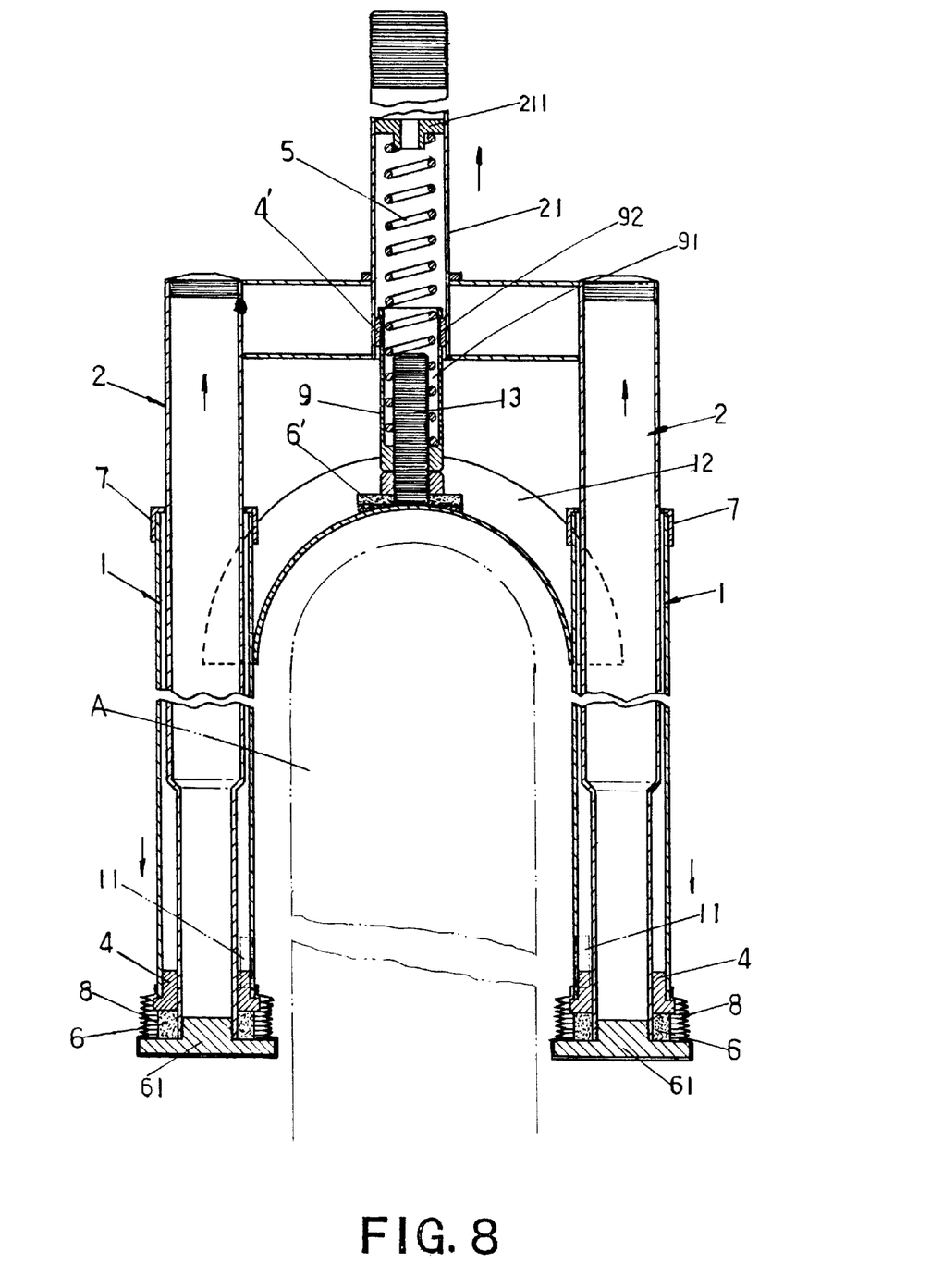
FIG. 8 is a cross-sectional drawing of FIG. 7 that illustrates the elastic extension operation of the stanchion tubes and sliders.
Figure 9:
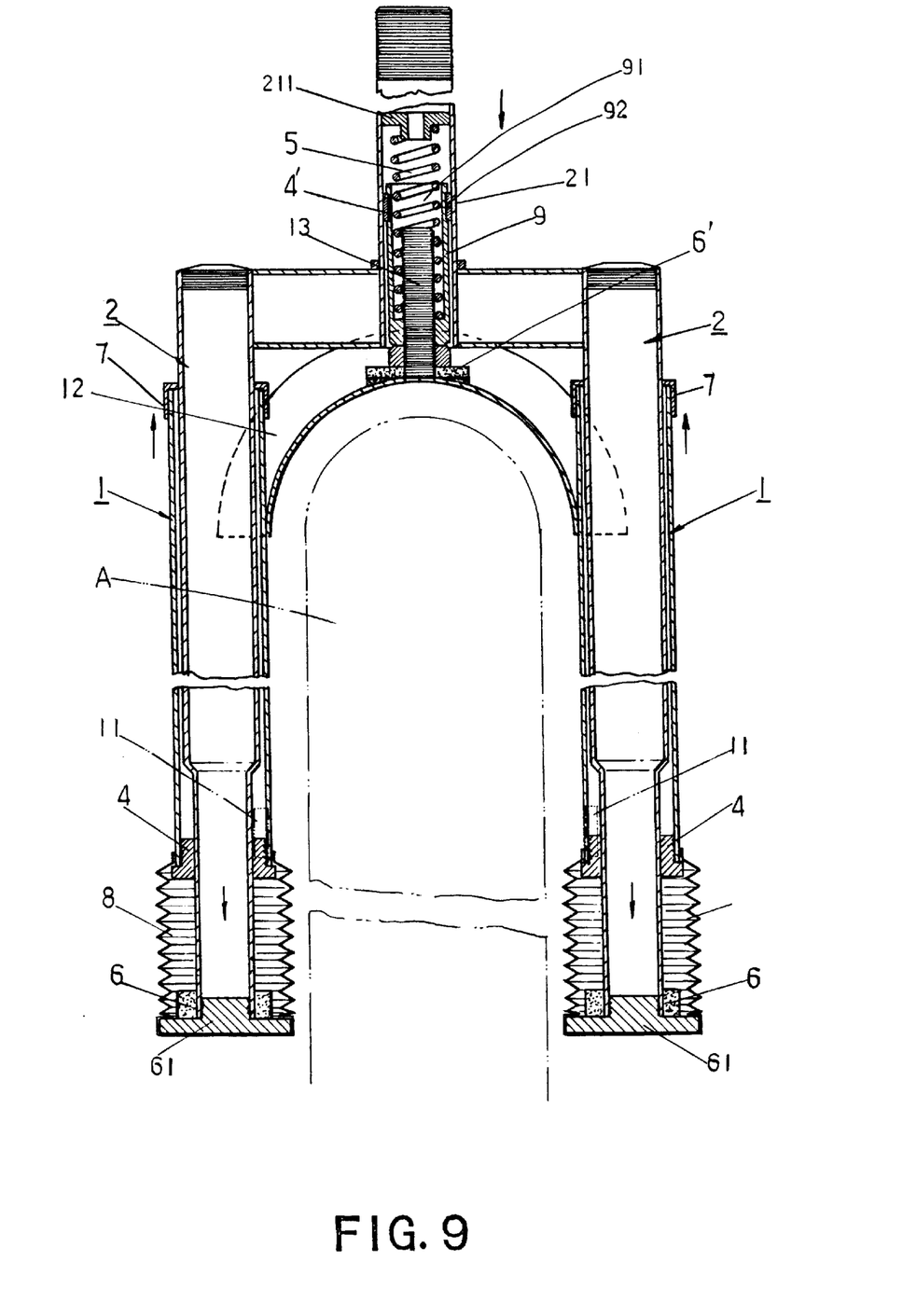
FIG. 9 is a cross-sectional drawing of FIG. 7 that illustrates the elastic compression operation of the stanchion tubes and sliders.

Referring to FIG. 7, FIG. 8, and FIG. 9, in the other embodiment of the invention herein, the adjustment screw 13 situated in the center section of the said connective block 12 can be modified with a threaded adjustment rod 9, with a containment hole 91 formed inside the adjustment rod 9 to provide for the insertion therein of the cushioning and shock absorbing cushioning elastic body 5 as well as an annular mounting groove 92 along the outer edges of the upper end; furthermore, the said bushings 4 and 4' providing for the coordinated excursive contact with the two stanchion tubes 2 and the sliders 2 are modified into a three component arrangement in which the two bushings 4 are similarly installed at the bottom ends of the sliders 2 and, furthermore, are situated at the same position as the dropouts 11, while the other remaining bushing 4' is installed in the annular mounting groove 92 at the upper end of the adjustment rod 9 and, furthermore, excursively contacts the cross member-mounted steerer tube 21 such that when the stanchion tubes 2 and the sliders 1 ascend and descend elastically during operation, they are individually capable of directly stabilizing and balancing the excursive contact.

To further elaborate, since the two lower bushings 4 provide for the coordinated excursive contact with the stanchion tubes 2 and the sliders 1 and, furthermore, are situated at the same position (i.e., height position) as the dropouts 11, after the coordinated excursion of the lower ends of the said stanchion tubes 2 in the lower bushings 4 and their exposure at the bottom ends of the sliders 1, unlike the conventional counterparts which are permanently positioned at the upper extent of the lower bushings, therefore, in operative coordination with the cushioning elastic body 5, the lower bushings 4 by means of the dropouts 11 similarly function as the direct fulcrum points of the raked arrangement of the stanchion tubes 2 and the sliders 1 such that the absence of stiction angles during their elastic ascending and descending operation thereby enables the cushioning elastic body 5 to achieve positive and sensitive shock diminishing performance during the smooth and responsive ascending and descending operation.

Consequently, since no stiction angle results from ascending and descending operation of the said stanchion tubes 2 and sliders 1, the other bushing 4' installed in the annular mounting groove 92 formed along the outer edges of the upper end of the adjustment rod 9 and, furthermore, in excursive contact with the cross member-mounted steerer tube 21 similarly only has to provide stability and balance and, without increasing friction, positively assists the stanchion tubes 2 and the sliders 1 to elastically ascend and descend in an operation that is smoother and more responsive.

Furthermore, after the said adjustment rod 9 is rotatively fastened onto the adjustment screw 13 in the center section of the cross member-mounted steerer tube 12 and since the said cushioning elastic body 5 is directly engaged within the containment hole 91, therefore, as per utilization requirements, the bicycle rider only has to alter the position of the adjustment rod 9 upward and downward to vary the elastic force exerted by the cushioning elastic body 5 and thus enable the two stanchion tubes 2 and sliders 1 to provide a cushioning elastic force to the bicycle frame capable of being effectively and positively adjusted at any time.

What is claimed is:

1. A cushioned telescopic type front fork assembly for a bicycle comprising:
   (a) a first portion including:
      (1) a pair of longitudinally extended stanchion tubes coupled together by a cross member extending between upper ends thereof; and,
      (2) a steerer tube extending longitudinally upward from an intermediate section of said cross member, said steerer tube defining a longitudinally extended inner space;
   (b) a second portion displaceably coupled to said first portion, said second portion including:
      (1) a pair of substantially tubular sliders having upper and lower ends, said sliders being coupled together by a connective block extending between said upper ends thereof, each said slider coaxially receiving therein one said stanchion tube of said first portion, each said slider having extending from said lower end thereof a dropout for supporting a front wheel center axle of the bicycle; and,
      (2) a pair of bushings respectively coupled to upper and lower ends of each said slider for slidably engaging said stanchion tube; and,
   (c) a cushioning elastic body captured between said first and second portions for resiliently biasing said first and second portions one relative to the other, said elastic body being disposed above an intermediate section of said connective block and passing through said cross member to extend into said steerer tube inner space.

2. The cushioned telescopic type front fork assembly as recited in claim 1 wherein said second portion further includes: an adjustment screw member extending from said connective block to engage said elastic body; and, an adjustment nut displaceably coupled to said adjustment screw for adjustably setting the resilient bias of said elastic body.

3. The cushioned telescopic type front fork assembly as recited in claim 1 wherein said first portion further includes: at least a pair of elastic pads each coaxially engaging a lower end of one said stanchion tube; and, at least a pair of packing blocks each coupled to said lower end of one said stanchion tube for retaining said elastic pad in engagement therewith, each said elastic pad being axially aligned with at least one said bushing coupled to said slider receiving said stanchion tube.

4. The cushioned telescopic type front fork assembly as recited in claim 2 wherein said second portion further includes an elastic pad disposed on said connective block about a base section of said adjustment screw to form a resilient barrier between said cross member and said connective block.

5. The cushioned telescopic type front fork assembly as recited in claim 2 wherein said second portion further includes:
   (a) an adjustment rod displaceably coupled to said adjustment screw, said adjustment rod having a longitudinally extended section terminating at an upper end, said longitudinally extended section defining a containment hole receiving therein a portion of said elastic body; and,
   (b) a bushing coupled to said upper end of said adjustment rod for slidably engaging at least one of said cross member and said steerer tube of said first portion.

* * * * *